United States Patent [19]
Roberts

[11] Patent Number: 5,497,616
[45] Date of Patent: Mar. 12, 1996

[54] HIGH TEMPERATURE MOUNTING FOR STRESS RELIEF OF A DOVETAIL

[75] Inventor: Martyn G. Roberts, Atlanta, Ga.

[73] Assignee: Rolls-Royce Inc., Reston, Va.

[21] Appl. No.: 341,990

[22] Filed: Nov. 16, 1994

[51] Int. Cl.⁶ .................................................... F02K 3/10
[52] U.S. Cl. ............................ 60/261; 60/39.32; 403/28
[58] Field of Search ................. 60/39.31, 39.32, 60/261; 403/28, 261, 262, 404

[56] References Cited

U.S. PATENT DOCUMENTS

| | | | |
|---|---|---|---|
| 2,686,655 | 8/1954 | Schörner | 60/39.32 |
| 4,512,699 | 4/1985 | Jackson | 403/28 |
| 4,540,304 | 9/1985 | Pavelka et al. | 403/28 |
| 4,850,732 | 7/1989 | Swanson | 403/28 |
| 4,934,857 | 1/1990 | Swanson | 403/28 |
| 5,022,805 | 6/1991 | Roberts | 60/39.32 |
| 5,083,424 | 1/1992 | Becker | 60/39.32 |
| 5,090,198 | 2/1992 | Nightingale et al. | 60/39.32 |
| 5,116,158 | 5/1992 | Carruthers et al. | 403/28 |
| 5,314,280 | 5/1994 | Gagliardi et al. | 403/28 |
| 5,335,490 | 8/1994 | Johnson et al. | 60/261 |

OTHER PUBLICATIONS

"Theoretical Basis for Design of Thermal-Stress-Free Fasteners", Blosser and McWithey, NASA Technical Paper 2226, 1983.

*Primary Examiner*—Richard A. Bertsch
*Assistant Examiner*—Ted Kim
*Attorney, Agent, or Firm*—Oliff & Berridge

[57] ABSTRACT

A high temperature mounting system useful, for example for ceramic composite flameholders in a gas turbine engine reheat system uses dovetail clamping. A flameholder carries a dovetail projection which is clamped against a further ceramic, intermediate member by wedge blocks on opposite sides of the dovetail. The intermediate member has raised edges with angled faces opposite the dovetail projection against which the wedge blocks bear. The assembly is clamped to a metal support or flange by clamp bolts which pass through each of the wedge blocks and the intermediate member. The included angle of the contact faces is determined by principles of DAZE geometry to keep the bolts from loosening due to differential thermal expansion. Each wedge block is clamped by single bolt and relative expansion between the bolts is absorbed by bolt bending or nut sliding.

14 Claims, 3 Drawing Sheets

U.S. Patent    Mar. 12, 1996    Sheet 3 of 3    5,497,616

HIGH TEMPERATURE MOUNTING FOR STRESS RELIEF OF A DOVETAIL

BACKGROUND OF THE INVENTION

1. Field of the Invention

The invention concerns a high temperature component mounting system. In particular it relates to a mounting system for attaching together components made of materials having substantially different thermal expansion coefficients.

2. Description of the Prior Art

It is known in designing a mechanical joint between a first component of low-expansion material, for example a ceramic or ceramic composite, and a second material of higher-expansion material, such as a metal or metal alloy, to use a conical interface between the materials. Then, when thermal expansion or contraction occurs the thermally mismatched surfaces can slide one over the other to accommodate differential expansion.

A mounting arrangement of this type is known from my earlier published U.S. Pat. No. 5,022,805 entitled "Cantilever Mounting System for Structural Members having dissimilar Coefficients of Thermal Expansion". The arrangement described therein concerns the mounting of components of a gas turbine engine reheat system. In particular, a ceramic composite flameholder is attached to a metal bracket using a bolted-up, frusto-conical collar inside the hollow flameholder. The metal bracket, ceramic composite flameholder and metal collar are all formed with frusto-conical mating surfaces which converge to a common vertex on the axis of the flameholder. The cone angles are chosen to produce stress free metal/ceramic interfaces and relative differential movement takes place over the operating temperature range without inducing unnecessary stress or slackness. It is important that sufficient expansion clearance is provided within the joint to accommodate differential movement between the components without stressing the ceramic material. A drawback with this arrangement is the accuracy with which the frusto-conical surfaces must be formed, and the difficulty of forming the mounting surface in the interior of the flameholder. The ceramic composite production process lacks sufficient inherent accuracy to produce usable "as cast" interface surfaces so additional, expensive machining steps are required.

An improved arrangement for mounting ceramic composite reheat flameholders which avoids the above mentioned drawbacks, was described in my earlier published U.S. Pat. No 5,090,198. Each flameholder therein was formed with a dovetail at its proximal end which was engaged by angled faces formed on a retaining plate which, in turn, was bolted to a supporting structure. A clearance space remained between the dovetail end of the flameholder and the structure. When the retaining plate was bolted in place a resilient seal, or bias means, was sprung into this space in order to retain engagement between the non-metallic, low expansion flameholder and the metallic, high expansion support structure.

In practice it has been found difficult to achieve adequate preload in this type of arrangement and at high temperature the seal tends to creep. Consequently, over a period of time during use the force with which the flameholders are held in place tends to diminish.

SUMMARY OF THE INVENTION

It is a primary objective of the present invention to provide a mounting arrangement for components of dissimilar materials and thermal expansion coefficients which permits relative growth due to differential thermal expansion, and to ensure that an adequate retaining force is provided which does not deteriorate significantly at elevated temperature or over a period of time.

According to the present invention a component mounting system tolerant to differential thermal expansion, comprises:

- a component constructed of a first material having a first thermal expansion coefficient,
- a support structure constructed of a second material having a second thermal expansion coefficient and to which the first component is to be secured,
- clamp means for clamping the first component to the support structure including means for engaging the first component with a clamping force, and
- an intermediate member constructed of material having the same coefficient of thermal expansion as the first component and interposed between said first component and the support structure and adapted to be engaged by the clamp means in counterbalance to the clamping force exerted on the first component.

This mounting may be formed by opposing angled faces carried by two members spaced apart on the second component and adapted to engage angled faces formed on opposite sides of a dovetail projection carried by the first component.

In a preferred form of the invention the clamping means comprises clamp bolts which possess an inherent resilience whereby the clamping means is provided with a degree of elasticity.

BRIEF DESCRIPTION OF THE DRAWINGS

The invention and how it may be carried out in practice will now be discussed in more detail with reference, by way of example, to the accompanying drawings, in which.

DETAILED DESCRIPTION OF A PREFERRED EMBODIMENT

The drawings illustrate a preferred mounting system for ceramic composite radial flameholders in the reheat system of a gas turbine propulsion engine. Flameholders are mounted in a Jet pipe downstream of a reheat fuel system to create zones in the exhaust stream where reheat combustion flames are able to stabilize. In the type of system to which the preferred embodiment belongs the flameholders comprise lengths of hollow gutter which project radially inwards from a support structure adjacent to the wall of the jet pipe. Clearly the flameholders reside in an extremely hostile environment because of a high velocity stream of very high temperature gases, perhaps even burning fuel mixture, even when the reheat system is not in use. Choice of flameholder material is, therefore, very important and becomes critical as normal combustion temperatures are increased to improve efficiency and specific performance. Clear choices in these circumstances are ceramic and high temperature composite materials.

The peripheral support structure, on the other hand, experiences more benign conditions being closer to the jet pipe wall and are normally bathed in a film of cool bypass air induced to flow over the inner surface of the jet pipe. Since the annular flameholder support structure resides in this cooler region it is preferred to construct it of a conventional, structural metal or metal alloy, for example a nickel alloy. The support structure may comprise an inwardly turned flange in the jet pipe structure.

Despite the relatively cooler conditions of the metal or metal alloy structure its relatively much greater thermal expansion more than compensates the very low thermal expansion of the ceramic or composite material of the flameholders. Thus, the flameholder mounting system has to accommodate a substantial differential thermal expansion between the ceramic or like component and metal support structure.

Figure 1:
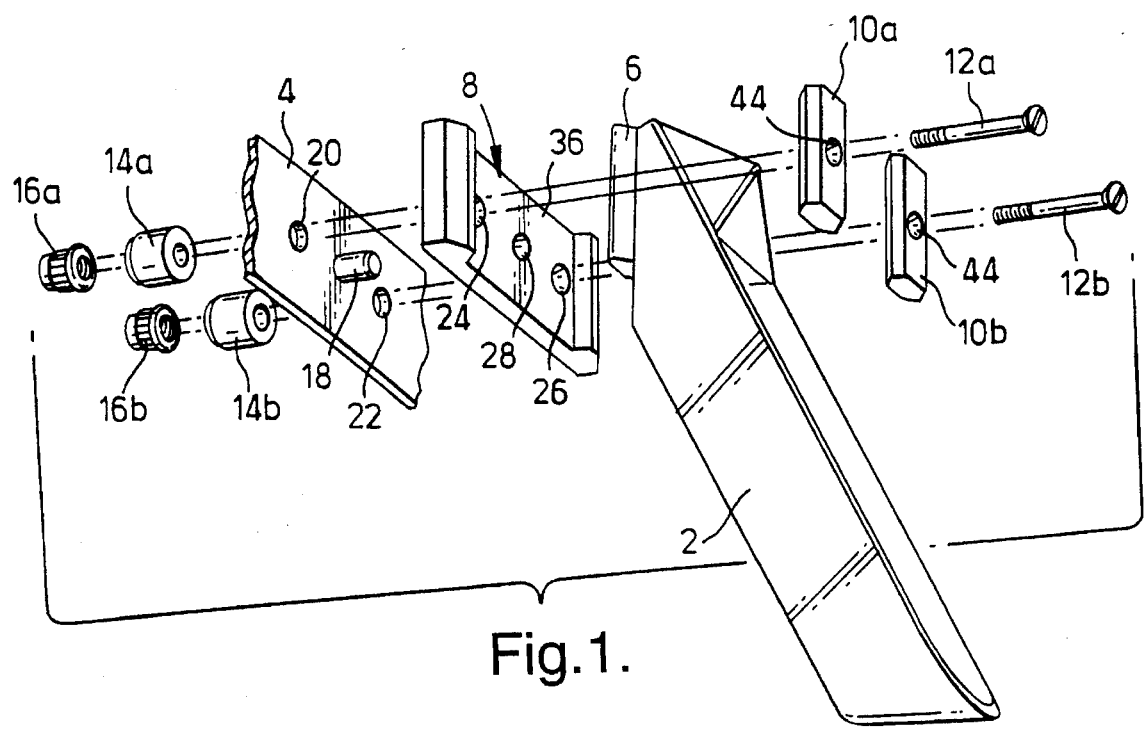
FIG. 1 shows an exploded view of the mounting system components for mounting reheat system flameholder.
Figure 2:
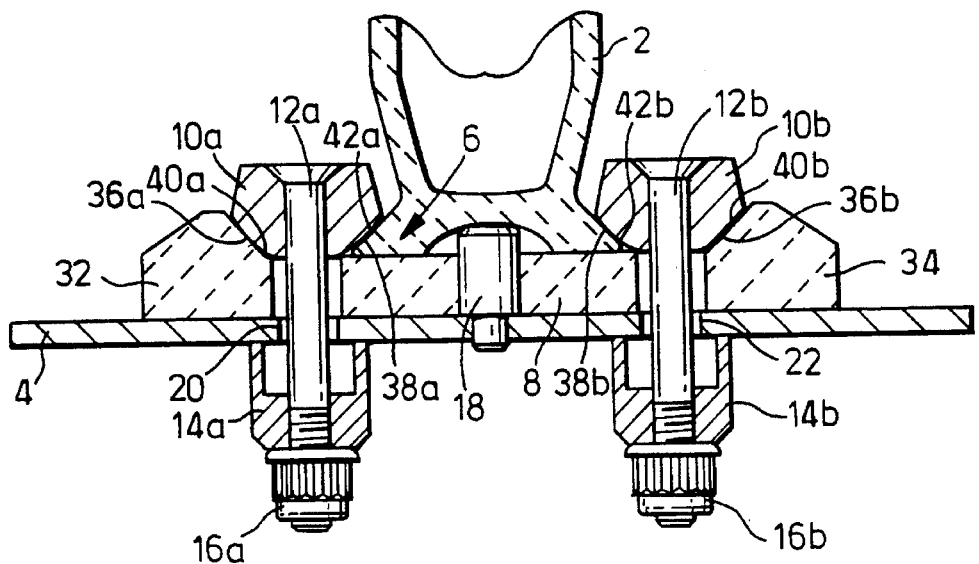
FIG. 2 shows a section through the flameholder mounting at cold, or normal room, temperature conditions.
Figure 3:
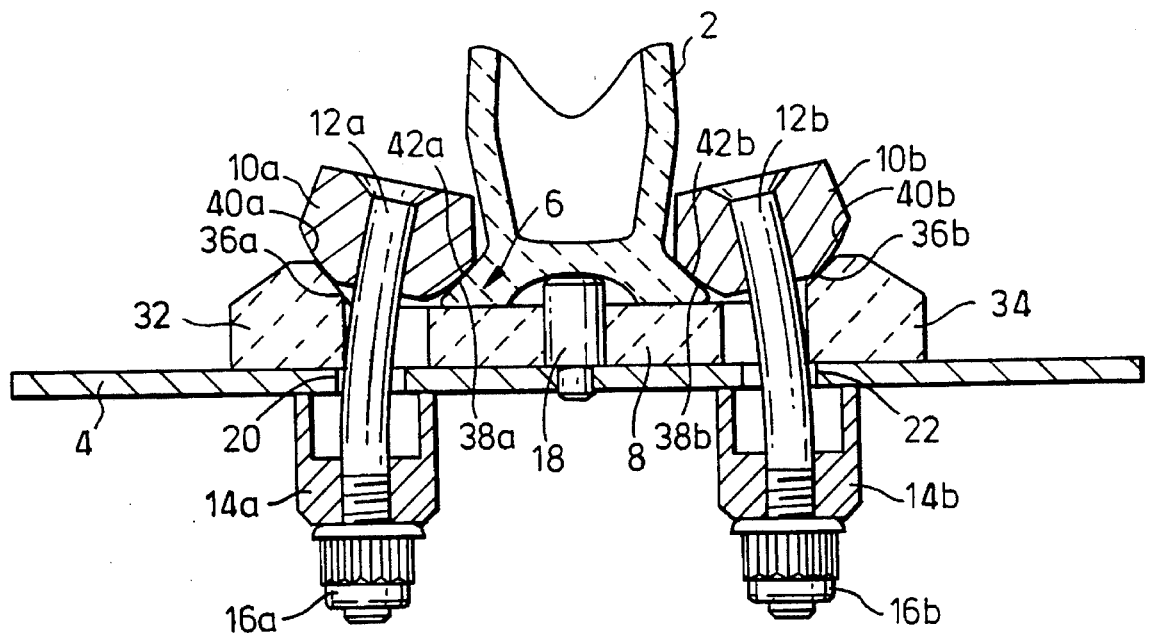
FIG. 3 shows the same section as FIG. 2 at hot temperature conditions.

Referring first to FIG. 1 a ceramic or composite material flameholder is illustrated at 2 and a section of a metal or metal alloy annular support structure, or support flange, is drawn at 4. In accordance with the invention as claimed the flameholder mounting system comprises: a dovetail formed on the back face of the flameholder 2, one flank of the dovetail is visible at 6, there is a second matching dovetail flank on the opposite hidden side of the flameholder; an intermediate member or mount plate 8, and clamping means consisting of wedge blocks 10a and 10b; clamp bolts 12a and 12b; spacing washers 14a and 14b; and nuts 16a and 16b. The drawing shows these parts in unassembled form, FIGS. 2 and 3 show sections through an assembled flameholder mounting under, respectively, cold and hot conditions. In all three figures like parts carry like references.

In FIGS. 2 and 3 it will be seen clearly how the dovetail projection 6 carried by the flameholder 2 is trapped by metal wedge blocks 10a and 10b against the intermediate member or mount plate 8 and clamped to the support flange 4 by the clamp bolts 12a and 12b. It will also be apparent that the mounting assembly is symmetrical about a radial plane bisecting the flameholder. The flameholder 2 and mount plate 8 are both constructed from the same ceramic composite material. The support flange 4 and wedge blocks 10a and 10b may be constructed of the same metal or metal alloy and the bolts 12a and 12b are preferably a high temperature alloy, for example a high temperature nickel alloy such as WASPALLOY (Registered Trade Mark).

Each flameholder mounting location is identified by a locating pin or peg 18 carried by the support flange 4. There are, therefore, a plurality of pegs 18 spaced apart around the support flange 4. On either side of a peg 18 two holes 20, 22 are drilled through flange 4 to receive bolts 12a and 12b. It is not essential that holes 20, 22 are on the same pitch circle, although in the example being described this is the case. The holes 20, 22 are slotted circumferentially to allow bolt clearance for differential growth between support flange 4 and mount plate 8. The holes cannot simply be oversize since they also locate the flameholder on peg 18 and restrict tangential movement of the flameholder. Mount plate 8 is also formed with through holes 24, 26, 28 to receive the bolts 12a, 12b and peg 18 respectively. The mount plate 8 on the side which faces the support flange 4 is formed flat. The opposite face, however, is formed with raised, radially aligned edges 32, 34 flanking a flat central region 36 against which the front of dovetail 6 is clamped.

The raised edges 32, 34 are formed with inwardly directed, inclined faces 36a, 36b which are the mirror images of angled faces 38a, 38b on opposite flanks of the dovetail 6. The wedge blocks 10a and 10b are also formed with oppositely inclined contact faces 40, 42 which in the assembled mounting system bear against the faces 36a, 36b, 38a, 38b on the mount plate 8 and dovetail 6 respectively.

The mount plate contact faces 36a, 36b and the contact faces 38a, 38b on opposite sides of dovetail 6 together form roughly V-shaped recesses on either side of the flameholder dovetail to receive wedge blocks 10a and 10b. The blocks 10a and 10b are also formed with a length substantially equal to the radial depths of faces 36a, 36b, 38a, 38b. As will become apparent from further description below the contact faces 40, 42 of the wedge blocks are cylindrically barrelled to ensure line contact with the faces of the flameholder dovetail 6 and mount plate 8.

The bolts 12a and 12b pass through the holes 24, 26 in the mount plate 8 and the holes 20, 22 in the annular support flange 4 and the wedge blocks 10a, 10b thereby clamping the mounting assembly in position, and trapping the flameholder dovetail. At the upstream side of the support flange 4 the bolts 12a, 12b are secured by nuts 16a and 16b with concentric spacer washers 14a and 14b against the support flange 4. The bolts 12a, 12b are tightened to a predetermined preload to maintain sufficient clamping force throughout the operating temperature range.

As previously mentioned the mounting system is illustrated in FIGS. 2 and 3 subject to cold and hot conditions respectively. It will be immediately apparent upon comparison of these illustrations that, in operation, differential thermal expansion causes the clamp bolts 12a and 12b to bend and the wedge blocks 10 to rock.

The mount plate 8 must have substantially the same thermal expansion as the flameholder 2 to ensure that the wedge block contact faces maintain their relationship. In the example both are constructed of ceramic composite material. The included angle subtended by the contact faces 40, 42 of the wedge blocks is preferably less than 90° to reduce the risk of jamming due to friction. An included angle of 90° gives a limiting coefficient of friction equal to 1. This wedge angle is determined in accordance with the principles of DAZE (Delta Alpha Zero Expansion) geometry.

A boundary between two materials with dissimilar thermal expansion coefficients can be chosen such that thermal expansion takes place along that boundary as a pure sliding movement. Any point on the surface, for the given thermal expansion coefficients of the materials, will follow a unique curve during expansion. Here "curve" is used in its widest sense and is intended to accorded its most general interpretation so as to include a curve of infinite radius, idea straight line. If both materials have isotropic expansion coefficients, ie the same in all directions then the curve is a flat surface. In the present example the material of the wedge blocks possesses an isotropic expansion coefficient. The ceramic composite material of the mount plate 8 and flameholder 2, in contrast have a through-thickness expansion coefficient greater than the in-plane expansion coefficient. The curve is therefore convex and can be approximated by a cone which in effect is extruded in a linear direction in to the plane of the drawing of FIGS. 2 and 3 to produce the shape of the wedge blocks 10a, 10b.

The principles of DAZE geometry are explained in NASA Technical Paper 2226, 1983 entitled "*Theoretical Basis for Design of Thermal-Stress-Free Fasteners*" by Max L. Blosser and Robert R. McWithey. This paper records work done on the design of fasteners for joining materials having dissimilar coefficients of thermal expansion, in particular stainless steel and carbon-carbon sheets. An especial problem considered concerned two-dimensional carbon-carbon consisting of layers of carbon-fiber cloth in a carbon matrix which possess orthotropic coefficients of expansion. A corresponding U.S. Pat. No 06/683,110 relating to the design of a thermal-stress-free fastener was filed on behalf of Blosser, McWithey and Kearns and assigned to NASA.

Figure 4:
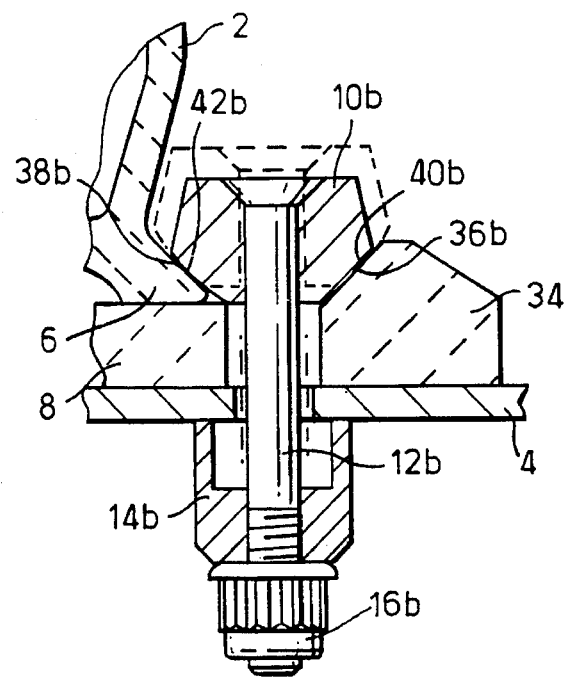
FIG. 4 shows a detail section to illustrate the thermal stress-free geometry of the clamping means.

FIG. 4 of the drawings shows a detail section through part of flameholder dovetail 6, mount plate 8, one of the wedge blocks 10, 10a, 10b and the corresponding clamp bolt 12, 12a, 12b. The differential thermal growth of the metal wedge block and clamp bolt relative to the carbon composite flameholder and mount plate is illustrated by comparison of the solid outline representing the wedge block and clamp bolt boundaries at normal (room) temperature and the dashed outline of the same components at high temperature.

As discussed above, according to DAZE principles, a metal fastener for use with a composite material having isotropic coefficients of expansion has a conical shape, the cone angle of which may be calculated by formulae set out in the above referenced documents. In this interface cone angle defines the included angle of faces 36, 38 of the dovetail and raised portions of the mount plate 8, and also the included angle of the faces 40, 42 of wedge blocks 10a, 10b. In the application of, for example threaded fasteners or rivets, this included angle is revolved around a fastener axis to generate a conical interface. In the present invention the same principles are applied to a dovetail wedge block and so the section angle is notionally extruded into the page of the drawing to generate the three-dimensional form of the block.

Figure 6:
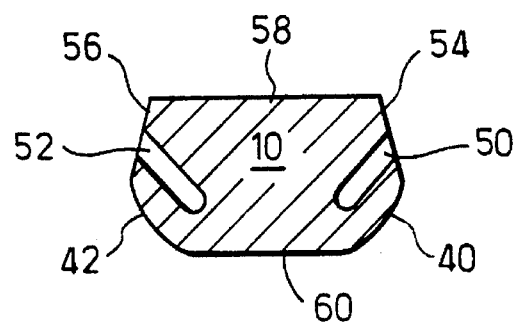
FIG. 6 shows an end view of the modified wedge block of FIG. 5.

Preferably the contact faces 40, 42 of the wedge blocks 10a, 10b are barrelled in order to control of the contact position over a range of manufacturing tolerances. This barrelling of the block faces is incorporated into the sectional view of a modified wedge block illustrated in FIGS. 6. If the faces were planar then the slightest manufacturing error would result in loading at either an inner or outer edge which would drastically change reaction loading at the line of contact. As a consequence this would adversely affect the carbon composite material and lead to premature, unpredicted failure. The amount of barrelling must also take into account the manner in which the included angle of the contact faces of the dovetail and the mount plate change as a result of the non-isotropic expansion coefficient of layered composite material.

The dimensions of the mounting assembly are chosen so in cold (room temperature) conditions, as would prevail in FIG. 2, the holes in the several parts through which the bolts 12a and 12b pass are co-axially aligned. As the temperature of the assembly increases to normal operating temperature there takes place differential thermal expansion of the metal support flange 4 relative to the ceramic or composite mount plate 8 and flameholder 2. Consequential movement at the interface between the components of materials having different expansion coefficients, ie mount plate 8 and support flange 4, occurs as sliding. The torque applied by nuts 16a, 16b to spacer washers 14a, 14b causes them to positively engage the face of support flange 4 thus preventing sliding movement therebetween. Therefore the whole of the differential expansion movement is absorbed by bending of the bolts 12a and 12b. This is illustrated in FIG. 3 although the effect is exaggerated in the drawing for clarity. Since the peg 18 functions as a dowel to locate the mounting plate 8 centrally on support flange 4 the bolts 12a, 12b are constrained to bend in opposite directions symmetrically about the axis of the peg.

A result of the bolts 12a,12b bending is to create a rocking movement of the wedge blocks 10a, 10b relative to the inclined faces 36a, 36b of the intermediate member 8 and the oppositely inclined faces 42a, 42b of the flameholder dovetail 6. Under the restraining tension of the bolts 12a, 12b the blocks 10a, 10b tend to rotate circumferentially about respective axes parallel to the contact lines of faces 36, 40 and 38, 42. This movement is greatly assisted, without compromising the clamping action of the bolts and wedges, by the aforementioned barrelling of the wedge contact faces.

Preferably the spacer washers 14a, 14b are incorporated to increase the effective length of bolts 12a, 12b thereby reducing bolt bending stresses, and to isolate the threaded portions of the bolts from regions subject to bending strain. Since the bolts are continually subject to flexing it is essential they are designed for adequate fatigue life under maximum load.

In an alternative arrangement the washers 14a, 14b slip on the rear surface of the support flange 4 in order to accommodate the relatively greater thermal expansion of the metal support flange 4, to which the mount plate 8 and flameholder 2 are clamped, compared to the expansion of the composite components. This is illustrated in FIG. 4. The diameters of the holes 24, 26 in the composite mount plate 8 are sufficient to accept the relatively greater thermal growth of the diameter of the bolts relative to the holes through which they pass. The diameters of holes 20, 22 in the metal support flange 4 are circumferentially slotted. Throughout this cycle of movement the bolts 12, 12a, 12b maintain the wedge blocks 10, 10a, 10b in substantially constant orientation with respect to the dovetail 6 and the mount plate 8 as described above.

The coefficient of friction between the abutting faces of the flange 4 and washers 14a, 14b is arranged such that, at the installed preload of bolts 12a, 12b, instead of the bolts bending when differential thermal expansion occurs the washers 14a, 14b slip. A polished surface on support flange 4 and solid lubricant will help reduce friction and hence lateral loads on the bolts and the mount plate.

Figure 5:
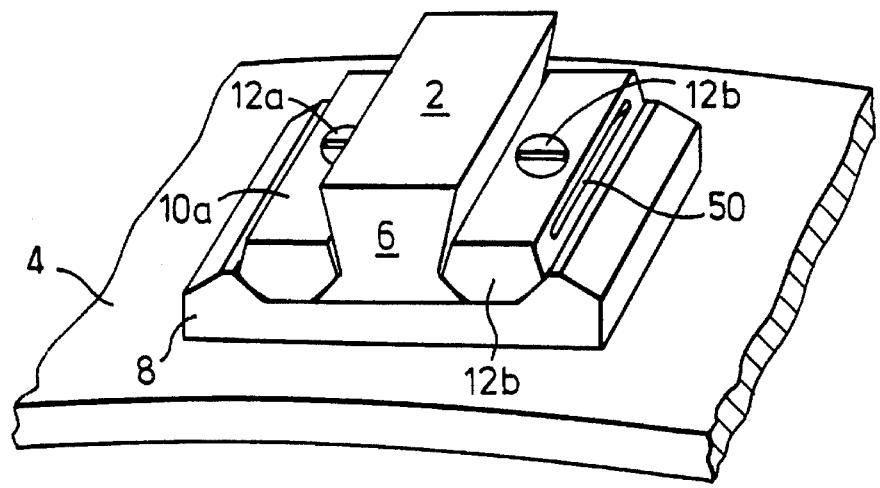
FIG. 5 shows a detail of an improved clamping means including modified wedge blocks.
Figure 7:
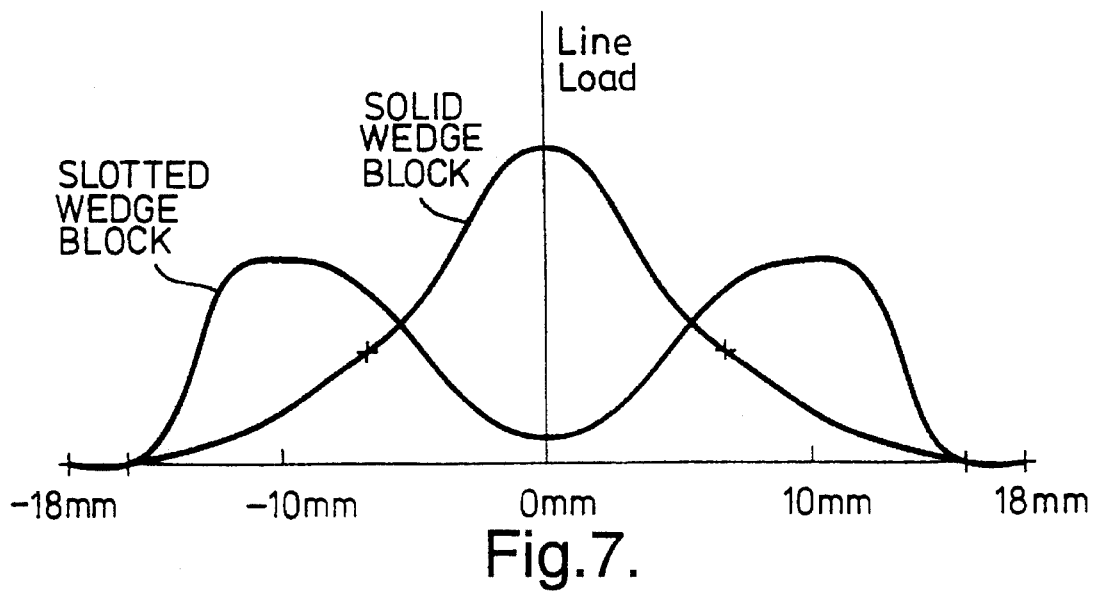
FIG. 7 illustrates the redistribution of clamping forces due to the modified wedge block of FIGS. 5 and 6.

The wedge blocks 10a, 10b, as illustrated in FIGS. 1 and 5 are generally elongate in shape and the bolt holes 44a, 44b formed centrally therein. The clamping bolts 12a, 12b thus pass through the center of the wedge blocks 10a, 10b. The clamping forces exerted by the wedge blocks 10a, 10b on the mount plate 8 and dovetail 6 therefore vary unevenly with axial distance from the bolt axis. The curve of the force varies according to Poisson's distribution as illustrated in FIG. 7 by the curve labelled "solid wedge block". Clearly such an uneven force distribution exerted on a composite component is not ideal. The form of the wedge blocks is therefore modified to produce a force distribution as shown by the double-humped curve labelled "Slotted Wedge Block". Elongate slots 50, 52 are milled into opposite faces 54, 56 of the wedge blocks as shown in the sectional view of a wedge block in FIG. 6.

The wedge blocks 10a, 10b are formed with transverse sections in the shape of irregular hexagons. The upper face 58 and lower face 60 are formed parallel, the barrelled contact faces 40, 42 extend the length of the blocks on either side of the lower face 60 and at a raised angle thereto. The remaining two sides 54, 56 close the transverse section and are formed planar in the illustrated example, but this is not essential. The slots 50, 52 are milled into the faces 54, 56 respectively at an angle thereto which leaves the slots substantially parallel to the chord of the adjacent barrelled face 40, 42. The length of the slots is about three-quarters of the length of a block while their depth is greater than than their width up to just over half of the thickness of a block in the plane of the slot. It will be apparent that the shape of the force distribution curve is determined to some extent by the dimensions of the slots and exact measurements and proportions may be found by experimentation or calculation.

I claim:

1. A component mounting system tolerant to differential thermal expansion, which comprises:

a first component constructed of a first material characterised by first thermal expansion characteristics and formed with a dovetail projection having angled faces which the component may be clamped, a support structure constructed of a second material characterised by second thermal expansion characteristics substantially different from said first thermal expansion characteristics and to which the first component is to be clamped, clamp means adapted to engage the angled faces of the dovetail projection of the first component to exert a clamping force whereby to clamp the first component to the support structure, and an intermediate member constructed of material having the same thermal expansion characteristics as the first component, said intermediate member including means to counterbalance the clamping force exerted on the first component, said means comprising angled faces which are adapted to be engaged by the clamp means, which angled faces are inclined oppositely to the angled faces on the first component, the intermediate member being interposed between said dovetail projection of the first component and the support structure.

2. A component mounting system as claimed in claim 1 wherein the clamp means comprises a plurality of bolts provided with means having oppositely angled faces for engaging the first component and the intermediate member.

3. A component mounting system as claimed in claim 2 wherein the clamp means include a wedge member trapped under each of the bolts.

4. A component mounting system as claimed in claim 3 wherein each of the wedge members is formed with a pair of oppositely angled faces adapted for engaging the first component and the intermediate member.

5. A component mounting system as claimed in claim 4 wherein the angled faces of at least the wedge members are barrelled.

6. A component mounting system as claimed in claim 4 wherein slots are formed in the wedge members substantially parallel to the angled faces whereby to modify a distribution of the clamp forces.

7. A reheat system for the jet pipe of a gas turbine propulsion engine which comprises:

a plurality of flame stabilising gutter members formed of a first material having first thermal expansion characteristics, a support structure formed of a second material having second thermal expansion characteristics substantially different from the thermal expansion characteristics of the first material, a mounting system tolerant to differential thermal expansion between the gutter members and the support structure for mounting each gutter member to the support structure, clamp means for clamping a gutter member to the support structure including means for engaging the gutter member with a clamping force, and an intermediate member constructed of material having the same thermal expansion characteristics as the gutter member and interposed between said gutter member and the support structure and adapted to be engaged by the clamp means in counterbalance to the clamping force exerted on the gutter member.

8. A reheat system as claimed in claim 7 wherein each gutter member is formed with a dovetail projection having an angled face engaged by the clamp means.

9. A reheat system as claimed in claim 8 wherein the intermediate member is also formed with an angled face which is engaged by the clamp means, which angled face is inclined oppositely to the angled face in the dovetail of the gutter member whereby to counterbalance the clamping force on the gutter member.

10. A reheat system as claimed in claim 9 wherein the clamp means comprises a plurality of bolts provided with means having oppositely angled faces for engaging the gutter member and the intermediate member.

11. A reheat system as claimed in claim 10 wherein the clamp means includes a wedge member trapped under each of the bolts.

12. A reheat system as claimed in claim 11 wherein each said wedge member is formed with a pair of oppositely angled faces.

13. A reheat system as claimed in claim 12 wherein the angled faces of at least the wedge members are barrelled.

14. A reheat system as claimed in claim 12 wherein slots are formed in the wedge members substantially parallel to the angled faces whereby to modify a distribution of the clamp forces.

* * * * *